Figure 1:
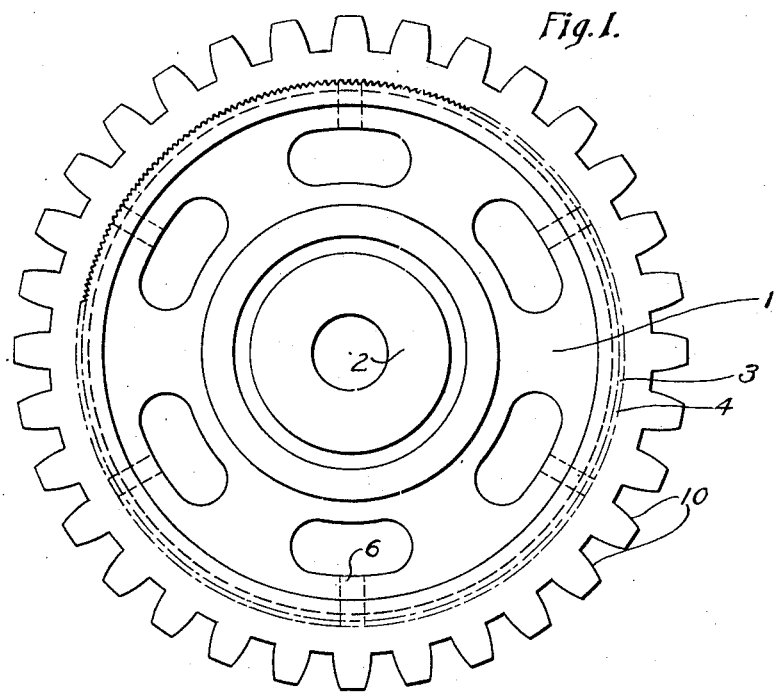

Dec. 14, 1926.

S. H. THOMPSON 1,610,635

METHOD OF FORMING COMPOSITE GEARS

Filed Jan. 26, 1921

WITNESSES:
L. F. Sonnemann
W. B. Jaspert

INVENTOR
Samuel H. Thompson.
BY
Wesley G. Carr
ATTORNEY

Patented Dec. 14, 1926.

1,610,635

UNITED STATES PATENT OFFICE.

SAMUEL H. THOMPSON, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF FORMING COMPOSITE GEARS.

Application filed January 26, 1921. Serial No. 440,247.

My invention relates to composite articles, more especially to articles comprising a metallic central body having a non-metallic working portion formed integrally therewith, such articles being adapted for use as gears, friction wheels, pulleys and other machine elements.

In manufacturing articles of the character designated, it is customary to mold a fibrous material around the knurled and grooved outer surface of a metallic member. The fibrous body consists of a plurality of layers, such as sectors or rings of fibrous sheet material impregnated with a binder capable of hardening under heat and pressure. The layers are superposed around a metallic member so that the edges of the laminations or sheets are perpendicular to the knurled surface. The assembled structure is placed in the matrix of a mold and subjected to heat and pressure to harden the binder and compact the material. The applied pressure compacts the fibres so that they fill the grooved surfaces, forming an anchorage for the non-metallic body.

In the molding process, a fairly high temperature is applied, ranging from 120° to 160° C. This high temperature and the difference in the coefficients of expansion of the fibrous and metallic materials tends to set up stresses which are localized at or near the center of the structure, causing the fibrous material to be ruptured, thus forming cracks and lines of cleavage, parallel to the laminations, around the periphery of the article. This is due, in part at least, to the rough knurled surface of the metal face which tends to prevent the lateral expansion and contraction of the laminated substance.

My invention obviates these difficulties, it being among the objects thereof to devise a method of forming such composite articles which shall prevent cracking thereof and which shall be adapted for quantity production.

In practising my invention, I provide a metallic member having a straight or cross knurled outer surface and having annular grooves formed in the center of the surface with openings to provide a means of escape for excess binding material. I wind a number of turns of fibrous material, impregnated with a binder, spirally or circumferentially around the knurled face and superpose a plurality of sectors or rings of fibrous material, impregnated with a binder, around the spirally or circumferentially wound layers, with their edges perpendicular thereto. I place this structure in the matrix of a mold and consolidate the mass by the application of heat and pressure. The described structure is such that the stresses tending to rupture the laminations of the perpendicular layers are taken up by the spirally or circumferentially wound layers.

Figure 2:
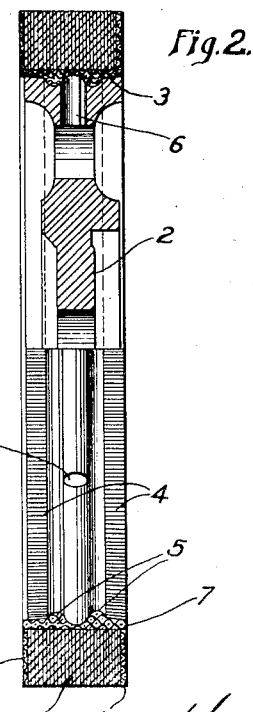

In the accompanying drawings forming a part hereof and in which similar reference characters designate similar parts, Fig. 1 is an elevational view of a metallic member having a non-metallic working body portion formed thereon, and Fig. 2 is a sectional view, partially in elevation, showing a metallic member having fibrous sheet material formed thereon in accordance with this invention.

I provide a metallic supporting member 1 having a hub 2 and a rim 3, the outer surface having small grooves or knurls 4 thereon and being provided with annular grooves 5, with openings 6 communicating therewith. I wind a sheet of fibrous material 7, such as fabric, paper, or the like, impregnated with a phenolic condensation product, spirally or circumferentially around the knurled surface 4 to a thickness of three or four layers. I then superpose a plurality of sectors or rings 8 of fibrous sheet material, such as paper, impregnated with a phenolic condensation product, around the spirally or circumferentially wound material 7 and place a number of layers of fabric 9 on the outer faces thereof.

The assembled structure is placed in a mold which is inserted between the platens of a hydraulic press. Heat and pressure are applied to harden the binder and compact the material, forming a homogeneous structure in intimate engagement with the metallic member 1. Gear teeth 10 may then be formed on the composite working portion of the structure by machining the same in the usual manner.

Although I have described a specific embodiment of my invention, it will be obvious to those skilled in the art that various modifications may be made therein without departing from the principles thereof. For instance, I may substitute any suitable binding material for the phenolic condensation product or any suitable fibrous material for the fabric and paper, or I may vary the relative thickness of the spirally or circumferentially wound portion and the superposed layers as desired.

I claim as my invention:

1. An article comprising a metallic member, and a composite working body portion of spirally wound layers of fabric and superposed layers of paper and a phenolic condensation product thereon.

2. An article comprising a metallic member having a knurled outer face and annular grooves, a plurality of layers of fabric wound spirally around the knurled surface thereof, and superposed layers of fibrous sheet material and a phenolic condensation product formed integrally therewith.

3. A method of forming composite articles which comprises providing a metallic member, the outer surface thereof being knurled and grooved, winding a strip of fibrous material impregnated with a binder around said knurled surface, superposing layers of fibrous material, impergnated with a binder, perpendicular to said strip, and applying heat and pressure thereto to form a unitary mass.

4. An article comprising a metallic member, spirally wound layers of fibrous sheet material thereon, superposed layers of fibrous sheet material and facing layers of fabric arranged in parallel planes perpendicular to said spirally wound layers thereon.

5. An article comprising a metallic member, a plurality of layers of fibrous sheet material impregnated with a hardened binder formed integral with said metallic member, some of said layers being arranged in parallel planes and at an angle to other of said layers, and covering layers of impregnated fabric thereon.

In testimony whereof, I have hereunto subscribed my name this 20th day of January, 1921.

SAMUEL H. THOMPSON.